(12) United States Patent
Chun

(10) Patent No.: US 8,771,867 B2
(45) Date of Patent: *Jul. 8, 2014

(54) BATTERY AND BATTERY HOUSING

(71) Applicant: Samsung SDI Co., Ltd., Yongin-si (KR)

(72) Inventor: Kwan Sic Chun, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/950,761

(22) Filed: Jul. 25, 2013

(65) Prior Publication Data

US 2013/0309557 A1 Nov. 21, 2013

Related U.S. Application Data

(63) Continuation of application No. 11/373,209, filed on Mar. 13, 2006, now Pat. No. 8,497,033.

(30) Foreign Application Priority Data

Mar. 24, 2005 (KR) ........................ 10-2005-0024668

(51) Int. Cl.
*H01M 2/00* (2006.01)
*H01M 2/02* (2006.01)
(52) U.S. Cl.
USPC .......................................... 429/163; 429/164
(58) Field of Classification Search
USPC ........................................................ 429/163
See application file for complete search history.

(56) References Cited

U.S. PATENT DOCUMENTS

| 4,347,293 A | 8/1982 | Goebel et al. |
| 6,001,504 A * | 12/1999 | Batson et al. ................. 429/163 |
| 6,159,631 A | 12/2000 | Thompson et al. |
| 8,497,033 B2 * | 7/2013 | Chun ............................ 429/163 |
| 2005/0069760 A1 | 3/2005 | Somatomo |

FOREIGN PATENT DOCUMENTS

| EP | 0 689 255 A2 | 12/1995 |
| EP | 0 742 599 A1 | 11/1996 |
| EP | 0 862 229 A1 | 9/1998 |
| EP | 1 132 983 A1 | 9/2001 |
| JP | 08-162084 A | 6/1996 |
| JP | 2001-126679 A | 5/2001 |
| JP | 2002-329484 A | 11/2002 |
| JP | 2004-039445 A | 2/2004 |
| JP | 2004-355920 A | 12/2004 |
| KR | 10-2004-0000129 A | 1/2004 |
| KR | 10-2004-0110335 A | 12/2004 |

OTHER PUBLICATIONS

European Office Action (from EP 06111291.8-2119) dated Jun. 5, 2009.

* cited by examiner

*Primary Examiner* — Ula C Ruddock
*Assistant Examiner* — Jacob Marks
(74) *Attorney, Agent, or Firm* — Lee & Morse, P.C.

(57) ABSTRACT

A battery including an electrode assembly having electrode plates, a can defining a space receiving the electrode assembly, and a cap plate covering the space, wherein the cap plate is configured to deform away from the space when predetermined sides of the can are deformed toward the space.

14 Claims, 9 Drawing Sheets

BATTERY AND BATTERY HOUSING

CROSS REFERENCE TO RELATED APPLICATION

This is a continuation application based on pending application Ser. No. 11/373,209, filed Mar. 13, 2006, the entire contents of which is hereby incorporated by reference.

BACKGROUND OF THE INVENTION

1. Field of the Invention

The present invention relates to a battery. More particularly, the present invention relates to a battery and battery housing configured to accommodate externally-applied pressure in a safe manner, wherein a cap portion can be bent in a predetermined direction when the battery is subjected to a transversely-applied pressure, in order to increase a margin of safety against potential short circuits.

2. Description of the Related Art

It is common for portable devices, e.g., video cameras, portable phones, laptop computers, PDA's, and other light weight multi-function devices to employ batteries, including secondary batteries, as a source of electric power. Types of secondary batteries include, e.g., nickel cadmium batteries, nickel hydrogen batteries, nickel zinc batteries, lithium secondary batteries, etc. The lithium secondary battery, in particular, is commonly employed due to its rechargeability, large capacity and compact size. The lithium secondary battery also exhibits a high operational voltage and a high energy density per unit weight, making it increasingly popular for the latest portable electronic devices.

FIG. 1 illustrates an exploded perspective view of a conventional battery. Referring to FIG. 1, a conventional battery may include an electrode assembly 112 having a positive electrode plate 113, a negative electrode plate 115 and a separator 114. The battery may further include a housing to enclose the electrode assembly 112, the housing including a can 110 for receiving the electrode assembly 112 and an electrolyte, and a cap assembly 120 for tightly sealing an upper opening 110a of the can 110.

The electrode assembly 112 may have the separator 114 wound between the positive electrode plate 113 and the negative electrode plate 115. A positive electrode tap 116 may be coupled to the positive electrode plate 113 and may protrude from an upper end of the electrode assembly 112. A negative electrode tap 117 may be coupled to the negative electrode plate 115 and may protrude from the upper end of the electrode assembly 112. The positive electrode tap 116 and the negative electrode tap 117 may be spaced apart by a predetermined distance and may be electrically insulated from each other. The positive electrode tap 116 and the negative electrode tap 117 may be made of metal, e.g., nickel.

The can 110 may be made of, e.g., aluminum or an alloy thereof, and may be formed by, e.g., a deep drawing method. The can 110 may have a substantially flat bottom surface.

The cap assembly 120 may include a cap plate 140, an insulation plate 150, a terminal plate 160 and an electrode terminal 130. The cap assembly 120 may be associated with a separate insulation case 170, and may then be coupled to the upper opening 110a of the can 110 so as to tightly seal the can 110.

The cap plate 140 may be made from, e.g., a metal plate, and may have a size and shape corresponding to those of the upper opening 110a of the can 110. The cap plate 140 may have a hole 141 formed therethrough at a center portion thereof. The hole 141 may have a predetermined size for receiving the electrode terminal 130.

The cap plate 140 may also have an electrolyte injection hole 142 formed therein in a suitable location, e.g., offset to one side. The electrolyte injection hole 142 may have a predetermined size and may be sealed by a sealing means 143. The electrolyte injection hole 142 provides for electrolyte to be injected through the cap assembly 120 after the cap assembly 120 is coupled to the upper opening 110a of the can 110. After injection of the electrolyte, the injection hole 142 may be sealed.

The insulation plate 150 may be made from an insulation material and may be attached to the lower surface of the cap plate 140. The insulation plate 150 may have a hole 151 formed therethrough corresponding to the hole 141, such that the electrode terminal 130 may pass through the hole 151. The insulation plate 150 may also have a receiving recess 152 formed in a lower surface thereof, in order to receive the terminal plate 160.

The terminal plate 160 may be made of a metal, e.g., a nickel alloy, and may be attached to the lower surface of the insulation plate 150. The terminal plate 160 may have a hole 161 formed therethrough corresponding to the hole 141, such that the electrode terminal 130 may pass through the holes 141, 161. The electrode terminal 130 may make contact with the terminal plate 160, e.g., along a contact region at the periphery of the hole 161. Accordingly, the electrode terminal 130 may pass through the holes 141, 151 and 161 and may be electrically connected with the terminal plate 160 while being electrically insulated from the cap plate 140 by a gasket 146 and the insulation plate 150.

The negative electrode tap 117, which is coupled to the negative electrode plate 115, may be welded to a side of the terminal plate 160. The positive electrode tap 116, which is coupled to the positive electrode plate 113, may be welded to a side of the cap plate 140 opposite to the negative electrode tap 117. Alternatively, the negative electrode tap 117 may be welded to the cap plate 140, and the positive electrode tap 116 may be welded to the terminal plate 160. Suitable welding methods may include, e.g., resistance welding, laser welding, etc. Of these, resistance welding may be particularly suitable.

The electrode terminal 130 may have the gasket 146 mounted thereon. The gasket 146 may be made of any suitable insulating material including, e.g., the material used for the insulation plate 150. The gasket 146 may be any suitable form, including, e.g., tubular, annular, flat with a hole defined therethrough, etc. The electrode terminal 130 may be inserted, along with the gasket 146, into the hole 141, such that the electrode terminal 130 is insulated from the cap plate 140.

The electrode terminal 130 may be connected to the negative electrode tap 117, and thus to the negative electrode plate 115, or it may be connected to the positive electrode tap 116, and thus to the positive electrode plate 113, so as to operate as a negative or positive electrode terminal.

The battery illustrated in FIG. 1 may be a conventional lithium secondary battery. Battery designs for the latest portable devices may take advantage of the lithium secondary battery's high energy density to provide small form factor batteries, e.g., thin batteries having an elongated, rectangular shape. However, such designs may have weak battery housings, i.e., the battery may not be able to withstand impact or externally applied pressure. In particular, if the battery is subjected to impact or pressure, the electrode assembly contained in the battery housing may be deformed due to deformation of the can. This may, in turn, result in internal defects such as an internal electric short circuit between the electrode plates. Such defects may have serious results, including fires and explosions of the battery.

FIG. 2 illustrates a generalized perspective view of a compressed conventional battery housing. In particular, FIG. 2 illustrates a conventional battery housing that has been compressed by a force Fa applied in a transverse direction, i.e., applied to opposing sides of the can 110 in a direction normal to the longitudinal axis b. Referring to FIGS. 1 and 2, when the battery is deformed by this transversely-applied force Fa, as is done during compression safety tests, the substantially flat bottom surface of the can 110 may deform inward and upward. Similarly, the substantially flat top surface of the cap assembly 120 may deform inward and downward.

The deformation or caving-in of the can 110 bottom may apply pressure to the electrode assembly 112 contained in the battery housing. In particular, it may force the electrode assembly 112 upward and against the cap assembly 120. This may result in the upper portion of the electrode assembly 112 coming into contact with various elements of the cap assembly 120, possibly causing an internal electric short circuit between the electrode plates and subsequent fire or explosion of the battery.

SUMMARY OF THE INVENTION

The present invention is therefore directed to a battery and battery housing, which substantially overcome one or more of the problems due to the limitations and disadvantages of the related art.

It is therefore a feature of an embodiment of the present invention to provide a battery and battery housing configured to accommodate externally-applied pressure in a safe manner, wherein a cap portion can be bent in a predetermined direction when the battery is subjected to a transversely-applied pressure.

It is therefore another feature of an embodiment of the present invention to provide a battery and battery housing having a concave feature formed in a lower surface of the cap portion, in order to cause the cap to bend away from the interior of the battery when the battery is subjected to a transversely-applied pressure.

At least one of the above and other features and advantages of the present invention may be realized by providing a battery including an electrode assembly having electrode plates, a can defining a space receiving the electrode assembly, and a cap plate covering the space, wherein the cap plate is configured to deform away from the space when predetermined sides of the can are deformed toward the space.

The cap plate may have a protuberance formed upward at a center portion of the cap plate, the protuberance including a stepped portion. The stepped portion may have a side surface inclined at an angle with respect to a major surface of the cap plate. The stepped portion may have a side surface normal to a major surface of the cap plate. The stepped portion may have a curved side surface. The stepped portion may have a height equal to at least 50% of a thickness of the cap plate. The protuberance may have a long dimension with a length of about 20% to about 70% of the cap plate. The cap plate may include two stepped portions extending away from the space, the stepped portions defining a center region of the cap plate, a hole may be defined through the cap plate in the center region, and the electrode assembly may further include an electrode terminal disposed through the hole and electrically coupled to an electrode plate.

The cap plate may have a recess defined in a surface that faces the space, and end regions of the cap plate may be coplanar with a center region of the cap plate. The recess may form a loop in the surface, the loop enclosing the center region. The loop may enclose a substantially rectangular region. At least two recesses may be defined in the surface, the recesses extending laterally across a width of the cap plate.

At least one of the above and other features and advantages of the present invention may also be realized by providing a battery housing for a battery electrode assembly, including a body, the body defining a space to contain the battery electrode assembly, and a cap plate defining an upper wall of the space, wherein an inner surface of the cap plate faces the space and includes at least one concave feature. The body and the cap plate may be monolithically formed. The concave feature may be defined by at least one stepped portion, the stepped portion extending away from the space.

The concave feature may be defined by two stepped portions extending away from the space and laterally across a width of the cap plate, the two stepped portions defining two end regions and a central region, and the central region may be offset from the two end regions, such that an inner surface of the central region is not coplanar with inner surfaces of the two end regions.

The concave feature may be a groove formed in the inner surface of the cap plate. The groove may be continuously formed in a loop.

At least one of the above and other features and advantages of the present invention may further be realized by providing a battery housing for housing an electrode assembly, including a can having an opening for receiving the electrode assembly, and a unit for covering the opening without short circuiting the electrode assembly if predetermined sides of the can are deformed inwardly.

The unit for covering may be configured to deform outward, away from the electrode assembly, if the predetermined sides of the can are deformed inwardly.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
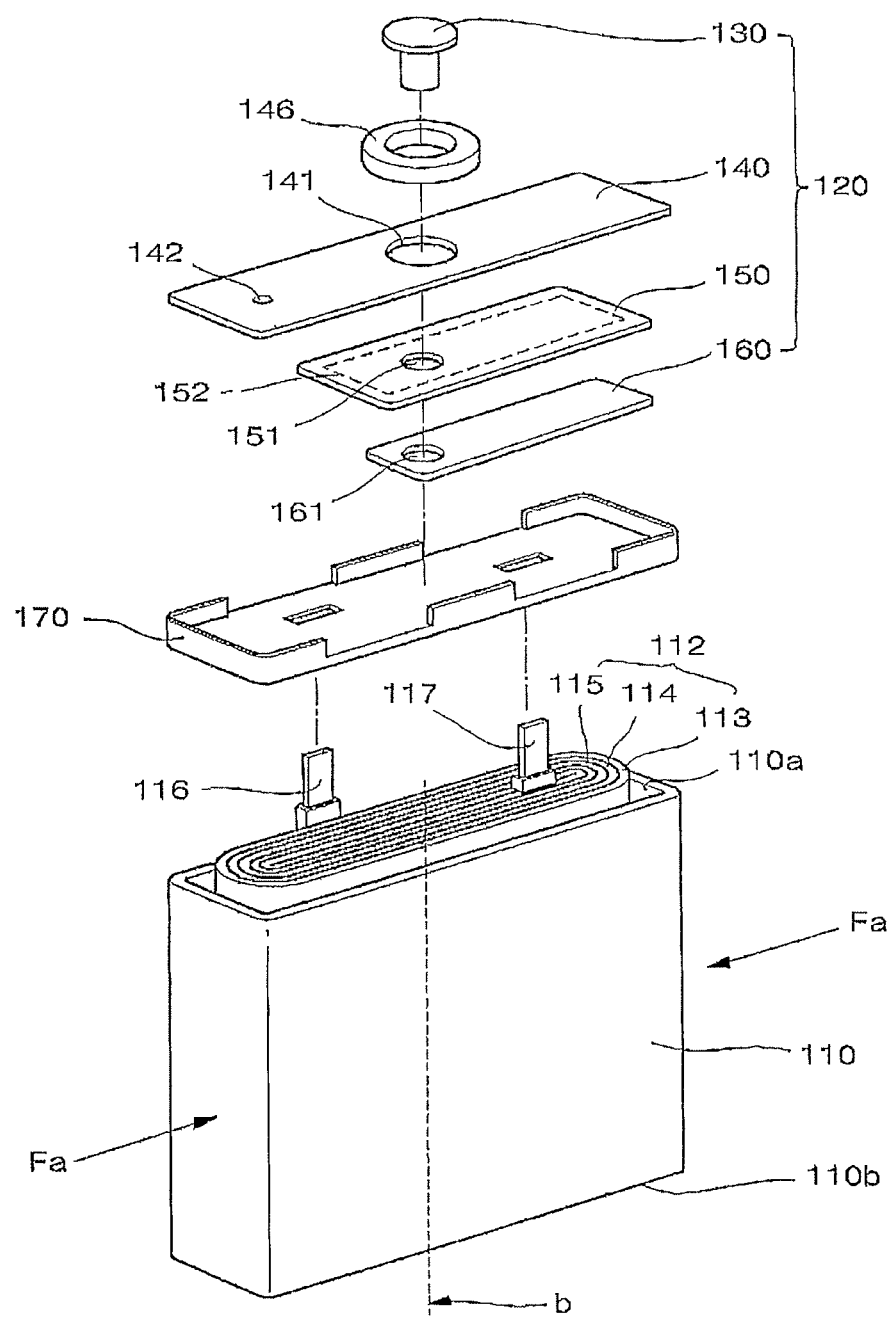
FIG. 1 illustrates an exploded perspective view of a conventional battery.
Figure 2:
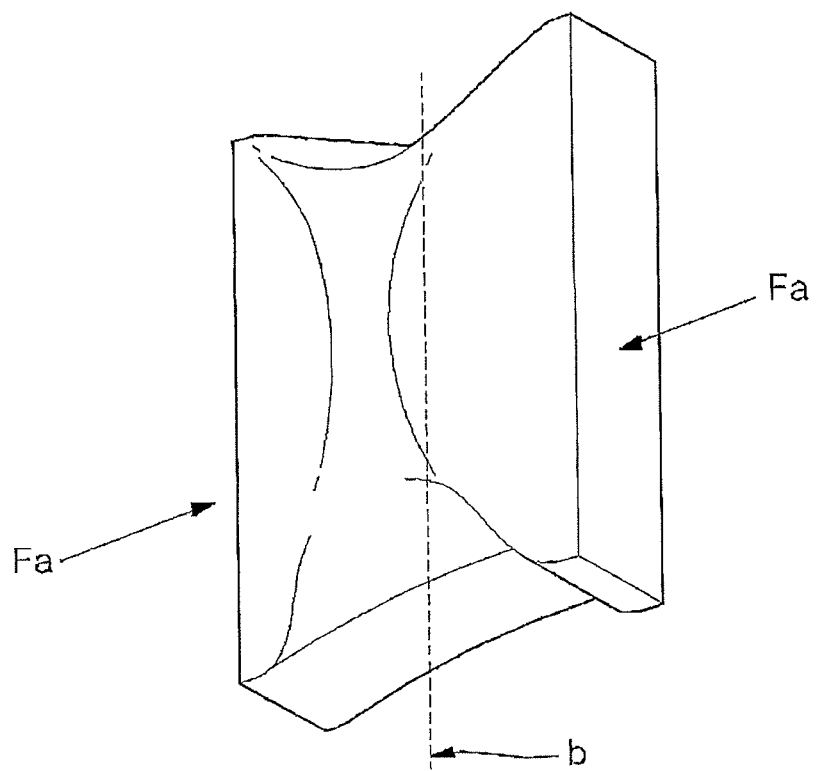
FIG. 2 illustrates a generalized perspective view of a compressed conventional battery housing.

Korean Patent Application No. 2005-0024668, filed on Mar. 24, 2005 in the Korean Intellectual Property Office, and entitled: "Lithium Secondary Battery," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration. Like reference numerals refer to like elements throughout.

A battery and battery housing according to the present invention may include a cap plate configured to prevent internal electric short circuits. The cap plate may have a stepped portion formed upward, and a corresponding concave underside, at a central region of the cap plate, such that transverse pressure applied to the battery causes deformation to the cap plate to occur in an upward direction, thereby preventing the upper portion of the electrode assembly contained in the battery housing from being pressed against the cap plate and avoiding internal electric short circuits between the electrode plates.

Figure 3:
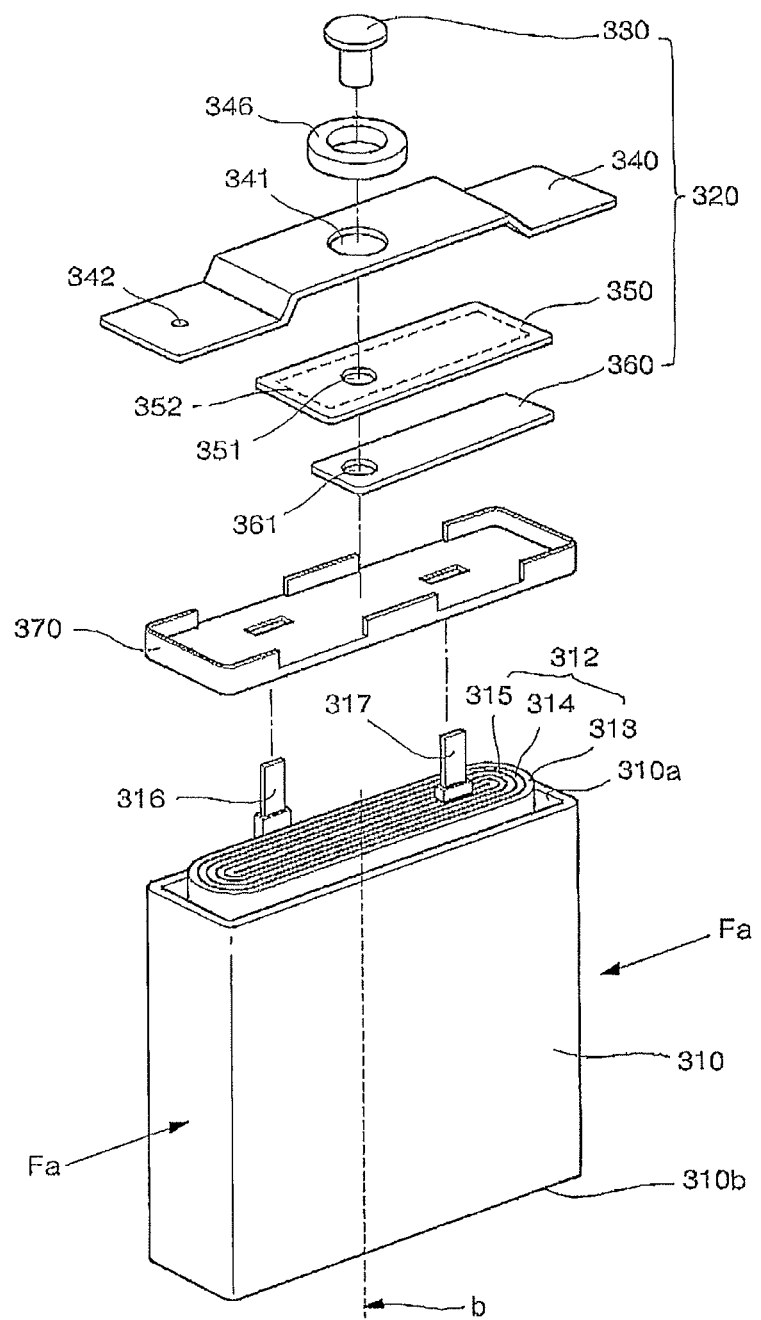
FIG. 3 illustrates an exploded perspective view of a battery and battery housing according to the present invention.

FIG. 3 illustrates an exploded perspective view of a battery and battery housing according to the present invention. Referring to FIG. 3, the battery according to the present invention may include an electrode assembly 312 having a positive electrode plate 313, a negative electrode plate 315 and a separator 314. The battery housing may include a can 310 containing the electrode assembly 312 and an electrolyte, and may include a cap assembly 320 for tightly sealing an upper opening 310a of the can 310.

The electrode assembly 312 may have the separator 314 wound between the positive electrode plate 313 and the negative electrode plate 315. A positive electrode tap 316 may be coupled to the positive electrode plate 313 and may protrude from the upper portion of the electrode assembly 312. A negative electrode tap 317 may be coupled to the negative electrode plate 315 and may protrude from the upper portion of the electrode assembly 312. The positive electrode tap 316 and the negative electrode tap 317 may be spaced apart and electrically may be insulated from each other. The positive electrode tap 316 and the negative electrode tap 317 may be formed from a metal, e.g., nickel metal.

The cap assembly 320 may include a cap plate 340, an insulation plate 350, a terminal plate 360 and an electrode terminal 330. The cap assembly 320 may be associated with a separate insulation case 370, and may then be coupled to the upper opening 310a so as to tightly seal the can 310. The cap plate 340 may have a hole 342 provided therein for the injection of electrolyte. The cap plate 340 may be formed of a metal and may have a thickness of about 0.8 mm. The cap plate 340 will be described in greater detail below.

The insulation plate 350 may be made from an insulation material and may be attached to a lower surface of the cap plate 340. The insulation plate 350 may have a hole 351 formed therethrough corresponding to a hole 341. The electrode terminal 330 may extend through the holes 341, 351. The insulation plate 350 may also have a recess 352 formed in a lower surface thereof, in order to receive the terminal plate 360.

The terminal plate 360 may be made of a metal, e.g., a nickel alloy, and may be attached to the lower surface of the insulation plate 350. The terminal plate 360 may have a hole 361 formed therethrough corresponding to the hole 341, such that the electrode terminal 330 may pass through the holes 341, 361. The electrode terminal 330 may make contact with the terminal plate 360, e.g., along a contact region at the periphery of the hole 361. Accordingly, the electrode terminal 330 may pass through the holes 341, 351 and 361, and may be electrically connected with terminal plate 360, while being electrically insulated from the cap plate 340 by a gasket 346 and the insulation plate 350.

The negative electrode tap 317, which is coupled to the negative electrode plate 315, may be welded to a side of the terminal plate 360. The positive electrode tap 316, which is coupled to the positive electrode plate 313, may be welded to a side of the cap plate 340 opposite to the negative electrode tap 317. Alternatively, the negative electrode tap 317 may be welded to the cap plate 340, and the positive electrode tap 316 may be welded to the terminal plate 360. Suitable welding methods may include, e.g., resistance welding, laser welding, etc.

The electrode terminal 330 may have the gasket 346 mounted thereon. The gasket 346 may be made of any suitable insulating material including, e.g., the material used for the insulation plate 350. The gasket 346 may be any suitable form, including, e.g., tubular, annular, flat with a hole defined therethrough, etc. The electrode terminal 330 may be inserted, along with the gasket 346, into the hole 341, such that the electrode terminal 330 is insulated from the cap plate 340.

The electrode terminal 330 may be connected to the negative electrode tap 317, and thus to the negative electrode plate 315, or it may be connected to the positive electrode tap 316, and thus to the positive electrode plate 313, so as to operate as a negative or positive electrode terminal.

Embodiments of the battery and battery housing, and, in particular, the cap plate 340, will now be described in greater detail with reference to FIGS. 4A-8B. In FIGS. 5A-8B, the cap assembly 320 of FIGS. 4A-4B may have the cap plate 340 substituted by cap plates 540, 640, 740 and 840.

Figure 4A:
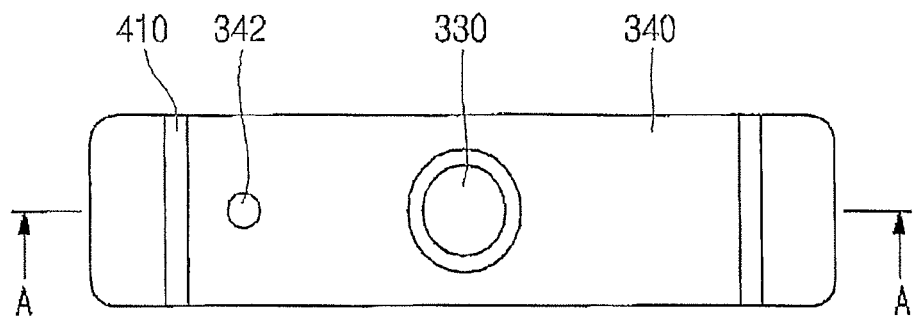
FIG. 4A illustrates a plan view of a cap plate for the battery and battery housing, according to a first embodiment of the present invention.
Figure 4B:
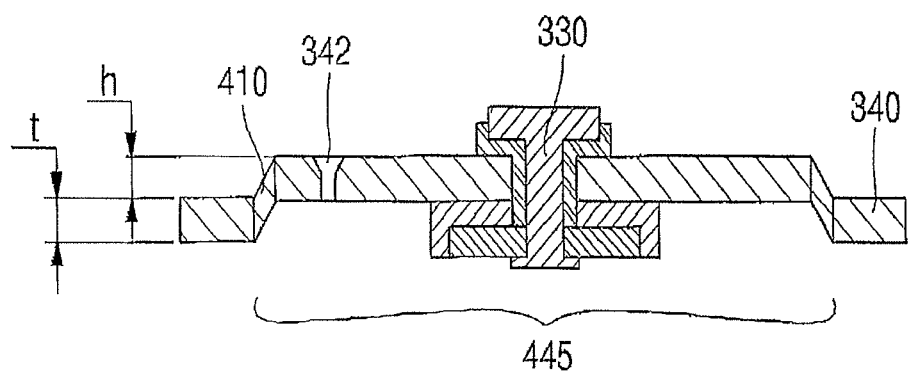
FIG. 4B illustrates a sectional view of the cap plate of FIG. 4A, taken along line A-A in FIG. 4A.

FIG. 4A illustrates a plan view of the cap plate 340 for the battery and battery housing, according to a first embodiment of the present invention, and FIG. 4B illustrates a sectional view of the cap plate 340 of FIG. 4A, taken along line A-A in FIG. 4A. Referring to FIGS. 3, 4A and 4B, the battery and battery housing according to the first embodiment of the present invention may include the cap plate 340. The cap plate 340 may be, e.g., a metal plate, and may have a shape and dimensions corresponding to the upper opening 310a of the can 310 illustrated in FIG. 3, in order to be installed therein.

The cap plate 340 may have the hole 341 formed therethrough, at a center portion thereof, the hole 341 having a predetermined size, to accommodate the insertion of the electrode terminal 330. When the electrode terminal 330 is inserted into the hole 341, the gasket 346 may be mounted around the periphery of the electrode terminal 330 and inserted, along with the electrode terminal 330, into the hole 341, in order to insulate the electrode terminal 330 from the cap plate 340. The cap plate 340 may also have the hole 342 formed at a side thereof for the injection of electrolyte.

Referring to FIGS. 4A and 4B, the cap plate 340 may have stepped portions 410 formed therein, the stepped portions 410 configured to extend away from the bulk of the battery housing when the cap assembly 320, which includes the cap plate 340, is assembled to the can 310. That is, the stepped portions 410 may extend upward, away from the body of the battery, and correspondingly define a concave underside of the cap plate 340.

Referring to FIGS. 3 and 4B, the stepped portion 410 may be inclined at an angle with respect to a longitudinal axis b of the battery. This may allow the cap plate 340 to bend outward easily, away from the body of the battery, when the lithium secondary battery is subjected to the transversely-applied force Fa.

The stepped portion 410 may have a height h greater than about 50% of the thickness t of the cap plate 340. In other words, the upper surface of a center region 445 of the cap plate 340 may be offset from the upper surface of the peripheral regions of the cap plate 340 by the height h, i.e. offset away from the body of the battery by the height h. The height h may be determined in consideration of the final assembly of the cap plate 340 to the other elements of the cap assembly 320. Depending on the thickness t of the material used for the cap plate 340 and the relative dimensions of the cap assembly 320, the can 310, etc., the stepped portion 410 may have a height h of about 0.1 mm to about 0.5 mm in some implementations.

If the height h of the step portion 410 is too small, e.g., smaller than about 0.1 mm, the cap assembly 320 may have little or no effect when the can 310 is subjected to the transverse force Fa, and the cap assembly 320 may not deform away from the body of the battery. If the height h of the step portion 410 too great, e.g., larger than about 0.5 mm, the cap assembly may be effective at bending away from the body of the battery in response to the transverse force Fa, but the cap assembly 320 may have an overall height that is too great, such that the battery does not satisfy the size requirements of the particular application. However, where size requirements are not an issue, the height h of the stepped portion 410 need not be limited.

Figure 5A:
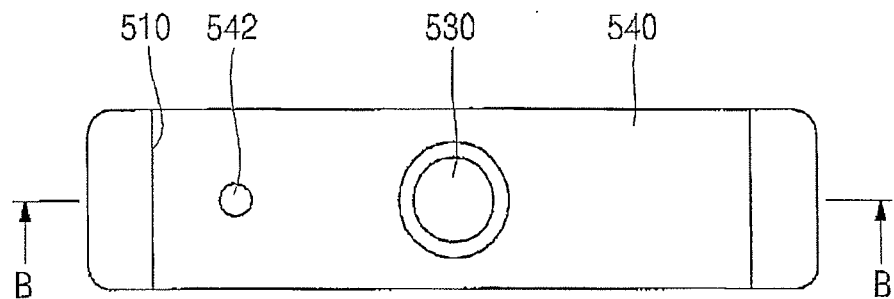
FIG. 5A illustrates a plan view of a cap plate for the battery and battery housing, according to a second embodiment of the present invention.
Figure 5B:
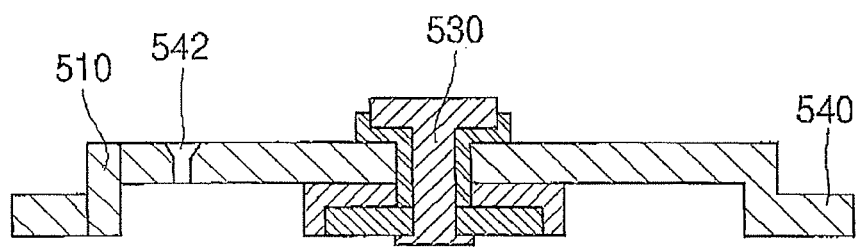
FIG. 5B illustrates a sectional view of the cap plate of FIG. 5A, taken along line B-B in FIG. 5A.

FIG. 5A illustrates a plan view of a cap plate for the battery and battery housing, according to a second embodiment of the present invention, and FIG. 5B illustrates a sectional view of the cap plate of FIG. 5A, taken along line B-B in FIG. 5A. Referring to FIGS. 5A and 5B, the cap plate 540 according to this embodiment of the present invention may include a stepped portion 510 protruding upward, wherein the side surfaces are vertically formed. The stepped portion 510 is configured to cause the cap plate 540 to bend outward in response to the transverse force Fa, so as to reduce the chances of an internal electric short circuit, in similar fashion to that described above in connection with the cap plate 340. However, the vertically formed side surfaces of the stepped portion 510 may cause the cap plate 540 to bend outward to a lesser extent than the cap plate 340.

Figure 6A:
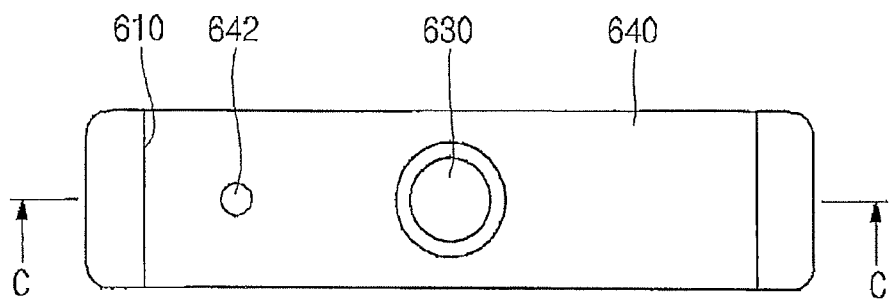
FIG. 6A illustrates a plan view of a cap plate for the battery and battery housing, according to a third embodiment of the present invention.
Figure 6B:
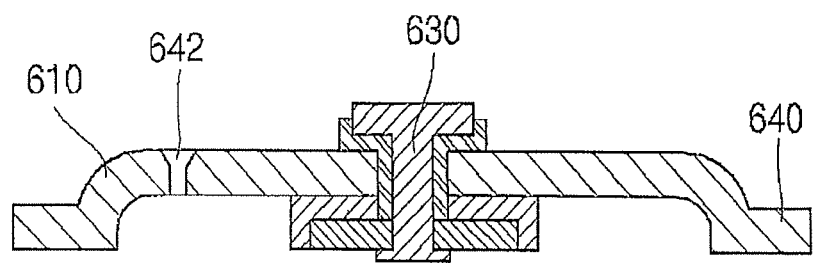
FIG. 6B illustrates a sectional view of the cap plate of FIG. 6A, taken along line C-C in FIG. 6A.

FIG. 6A illustrates a plan view of a cap plate for the battery and battery housing, according to a third embodiment of the present invention, and FIG. 6B illustrates a sectional view of the cap plate of FIG. 6A, taken along line C-C in FIG. 6A. Referring to FIGS. 6A and 6B, the cap plate 640 according to this embodiment of the present invention may include a stepped portion 610 protruding upward, wherein the side surfaces are curved. The stepped portion 610 is configured to cause the cap plate 640 to bend outward in response to the transverse force Fa, in similar fashion to that described above in connection with the cap plate 340. However, by forming the stepped portion 610 in the form of a smooth curve, it may be possible to reduce stresses in the cap plate 640 material during manufacture of the cap plate 640 and when the transverse force Fa is applied to the battery.

Figure 7A:
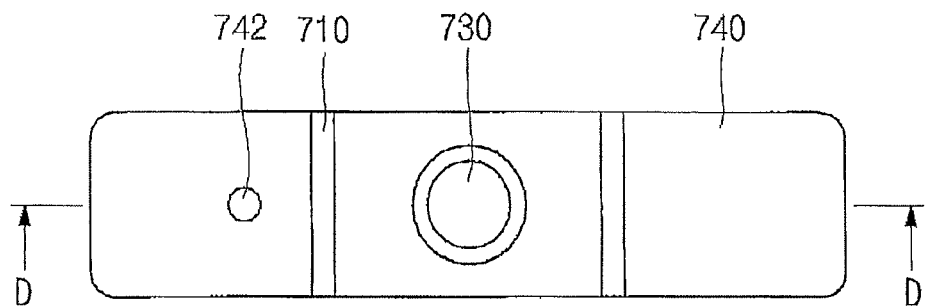
FIG. 7A illustrates a plan view of a cap plate for the battery and battery housing, according to a fourth embodiment of the present invention.
Figure 7B:
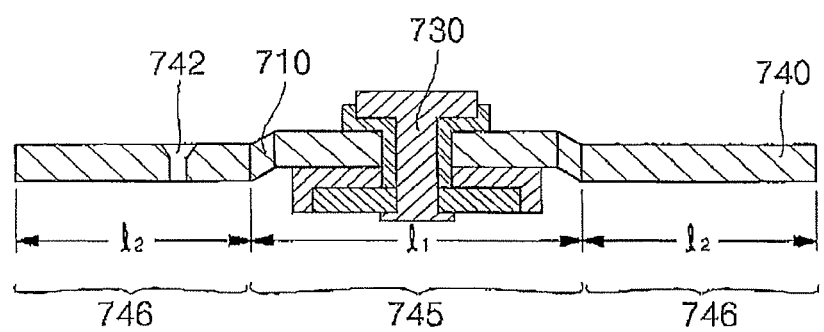
FIG. 7B illustrates a sectional view of the cap plate of FIG. 7A, taken along line D-D in FIG. 7A.

FIG. 7A illustrates a plan view of a cap plate for the battery and battery housing, according to a fourth embodiment of the present invention, and FIG. 7B illustrates a sectional view of the cap plate of FIG. 7A, taken along line D-D in FIG. 7A. Referring to FIGS. 7A and 7B, the cap plate 740 according to this embodiment of the present invention may include stepped portions 710 protruding upward, wherein a center region 745 of the cap plate 740 is defined by the stepped portions 710. The stepped portions may protrude upward in any suitable form, including, e.g., at an angle, perpendicular to the major plane of the cap plate 740, or in a rounded shape, as described above in connection with FIGS. 4A-6B.

The center region 745 may constitute a predetermined portion of the cap plate 740. In particular, the length $l_1$ of the center region 745, as defined by two stepped portions 710, may be about 20% to about 70% of the overall length of the cap plate 740.

If the length $l_1$ of the center region 745 is greater than about 70% of the overall length of the cap plate 740, the center region 745 may be too long. In particular, the end regions of the cap plate 740, outside the center region 745, may be so short that welding in the end regions becomes impractical. Furthermore, if the center region 745 is too long, it may have a detrimental effect on the ability of the cap plate 740 to deform outwardly in response to the transverse force Fa. Specifically, the magnitude of the outward deformation of the cap plate 740 may be insufficient to provide the desired margin of safety for the electrode assembly 312, i.e., the electrode assembly 312 may get short circuited when the battery housing is deformed.

If the length $l_1$ of the center region 745 is less than about 20% of the overall length of the cap plate 740, the center region 745 may be too short. In particular, it may make the mounting of a terminal plate 360 to the insulation plate 350 unstable when the cap assembly 320 is put together.

The stepped portions 710 also define end regions 746 of the cap plate 740. Each end region 746 may have a length $l_2$ of about 1 mm to about 10 mm, as defined between the stepped portion 710 and the end of the cap plate 740. In an implementation, the cap plate 740 has a thickness of 0.8 mm, and the end region 746 has a length $l_2$ that is greater than about 1 mm, in order to provide a stable portion whereby the cap plate 740 is welded to the upper opening 310a of the can 310. The end region 746 may also have a length $l_2$ that is less than or equal to about 10 mm, in order to allow enough room in the center region 745 for the insulation plate 350 and the terminal plate 360, which are mounted below the cap plate 740.

Figure 8A:
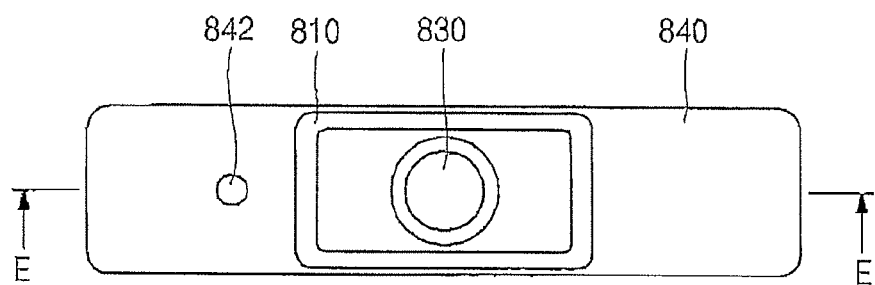
FIG. 8A illustrates a plan view of a cap plate for the battery and battery housing, according to a fifth embodiment of the present invention.
Figure 8B:
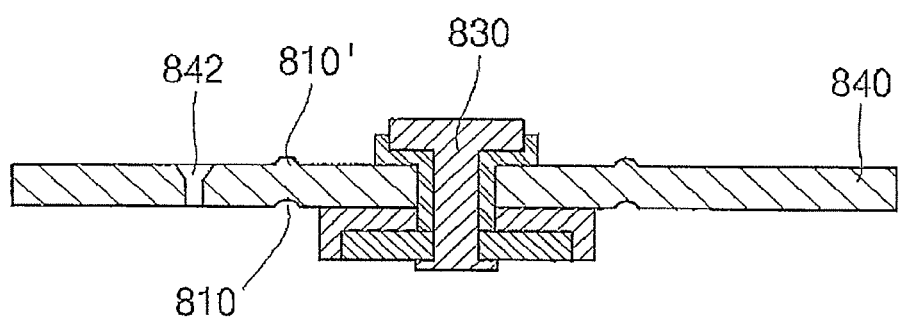
FIG. 8B illustrates a sectional view of the cap plate of FIG. 8A, taken along line E-E in FIG. 8A.

FIG. 8A illustrates a plan view of a cap plate for the battery and battery housing, according to a fifth embodiment of the present invention, and FIG. 8B illustrates a sectional view of the cap plate of FIG. 8A, taken along line E-E in FIG. 8A. Referring to FIGS. 8A and 8B, the cap plate 840 according to this embodiment of the present invention may include a feature 810, wherein the feature 810 is a concave recess formed on the underside of the cap plate 840. The feature 810 is configured to cause the cap plate 840 to bend outward in response to the transverse force Fa, in similar fashion to that described above in connection with the cap plate 340.

In the cap plate 840, the upper surface of the cap plate 840 may be substantially planar, while the opposite surface, i.e., the inner surface when the cap plate 840 is installed in the can 310, has the feature 810 formed therein. The feature 810 may be, e.g., a groove. Whereas the center region of the cap plate is displaced or vertically offset from the end regions of the cap plate in the embodiments described above in connection with FIGS. 4A-7A, in the fifth embodiment the center region of the cap plate 840 may be substantially coplanar with the end regions of the cap plate 840.

The feature 810 may be formed as a continuous, substantially rectangular feature, i.e., a substantially rectangular loop, that defines a center region inside the feature 810, as illustrated in FIG. 8A. The feature 810 may surround the electrode terminal 830. In another implementation, discontinuous features 810 may be formed, e.g., a pair of linear features (not shown) may be formed across the width of the cap plate 840, i.e., so as to be transverse to the line E-E in FIG. 8A. Still other implementations are possible, including continuous features defining, e.g., a rectangle having equal length sides (a square), an ellipse, etc.

The feature 810 may be formed by any suitable operation including, e.g., etching or stamping. In an implementation, the feature 810 is formed by a stamping operation. As described above, the upper surface of the cap plate 840 may be substantially planar. However, where the feature 810 is formed by stamping, the stamping operation may generate a corresponding convex protuberance 810' extending above the substantially planar surface of the cap plate 840, away from the battery. That is, in the implementation illustrated in FIGS. 8A and 8B, a stamping operation may simultaneously form the feature 810 on the underside of the cap plate 840 and the corresponding protuberance 810' on the top side of the cap plate 840. Thus, the protuberance 810' may be a relatively narrow elevated feature formed in a substantially rectangular loop shape. Apart from this protuberance 810', the upper surface of the cap plate 840 may be planar.

Figure 9:
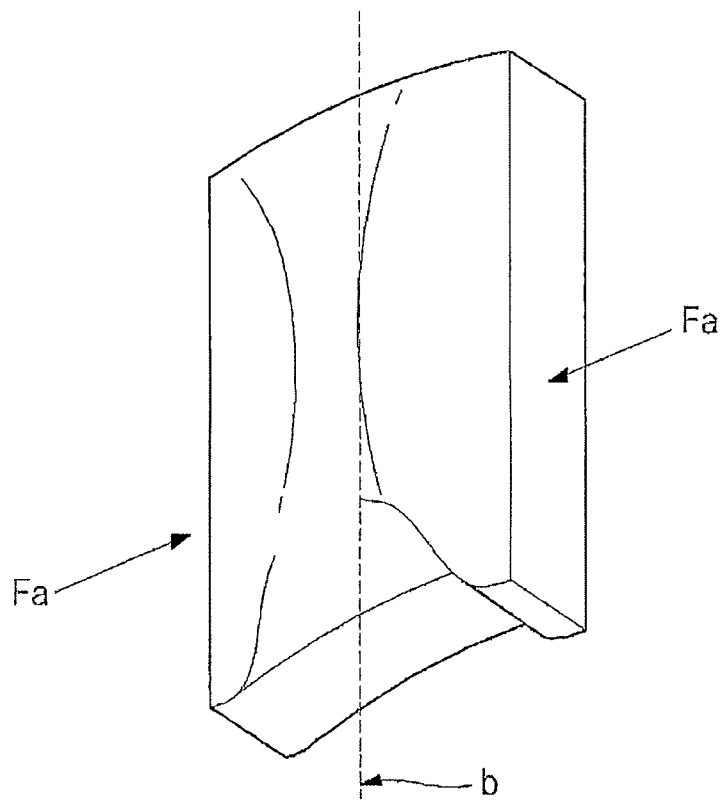
FIG. 9 illustrates a generalized perspective view of a compressed battery housing according to the present invention.

Hereinafter, the operation of the battery and battery housing according the present invention will be described. FIG. 9 illustrates a generalized perspective view of a compressed battery housing according to the present invention. Referring to FIG. 9, when the battery is deformed by the transversely-applied force Fa so as to compress the sides inward, i.e., in a direction normal to the longitudinal axis b, the substantially flat bottom surface of the can 110 may deform inward and upward. However, the cap assembly may be bent upward and outward. As a result, no force is applied to the upper portion of the electrode assembly contained in the battery housing, so that an internal electric short circuit does not occur in the electrode assembly.

In other words, if the stepped portion or recessed feature is formed as described above in connection with FIGS. 4A-FIG. 8A, pressure applied to the electrode assembly can be minimized in the safety compression test, wherein a prescribed force is applied to the sides of the battery, thereby improving the safety of the battery.

Exemplary embodiments of the present invention have been disclosed herein, and although specific terms are employed, they are used and are to be interpreted in a generic and descriptive sense only and not for purpose of limitation. For example, while the battery housing is described as having the cap plate separately provided and mounted to the battery housing, it will be appreciated that the cap plate according to the present invention may be monolithically formed with the battery housing, e.g., by a deep drawing process, and another portion of the housing, e.g., a separately formed bottom plate, may be separately provided in order to allow installation of the electrode assembly. Moreover, it will be appreciated that the present invention, while described above in the context of a prismatic or rectangular battery, may similarly be applied to cylindrical batteries, e.g., cylindrical lithium secondary batteries.

Accordingly, it will be understood by those of ordinary skill in the art that various changes in form and details may be made without departing from the spirit and scope of the present invention as set forth in the following claims.

What is claimed is:

1. A prismatic battery, comprising:
an electrode assembly including electrode plates and a separator;
a can defining a space receiving the electrode assembly; and
a cap plate covering the space, the cap plate being configured to deform away from the space when predetermined sides of the can are deformed toward the space,
wherein a hole is defined through the cap plate in a center region thereof,
wherein the electrode assembly further includes an electrode terminal disposed through the hole such that an upper portion thereof is exposed at an exterior of the prismatic battery, the electrode terminal being electrically coupled to one of the electrode plates via a terminal plate and being electrically insulated from the cap plate,
wherein the cap plate has at least two stepped portions extending away from the space, the at least two stepped portions:
forming one concave feature around the center region including a center portion on which the hole is formed, and
offsetting the center region from peripheral regions of the cap plate such that a distance from the center region to the space is greater than a distance from the peripheral regions to the space,
wherein each stepped portion has a side surface inclined at an angle with respect to a major surface of the cap plate, and
wherein the terminal plate and the electrode terminal are coupled to the cap plate, the terminal plate and a lower portion of the electrode terminal being disposed between the concave feature and the electrode assembly.

2. The prismatic battery as claimed in claim 1, wherein the concave feature has a long dimension with a length of 20% to 70% of the cap plate.

3. The prismatic battery as claimed in claim 2, wherein each stepped portion has a height equal to at least 50% of a thickness of the cap plate.

4. The battery as claimed in claim 2, wherein the at least two stepped portions extend away from the space, the stepped portions defining the center region of the cap plate.

5. A prismatic battery, comprising:
an electrode assembly including electrode plates and a separator;
a can defining a space receiving the electrode assembly; and
a cap plate covering the space, the cap plate being configured to deform away from the space when predetermined sides of the can are deformed toward the space;
wherein a hole is defined through the cap plate in a center region thereof,
wherein the electrode assembly further includes an electrode terminal disposed through the hole such that an upper portion thereof is exposed at an exterior of the prismatic battery, the electrode terminal being electrically coupled to one of the electrode plates via a terminal plate and being electrically insulated from the cap plate, wherein the cap plate has grooves, each of which being formed on an inner surface of the cap plate between end regions of the cap plate and the center region of the cap plate and facing the space such that the grooves have a concavity open towards the space, wherein the inner surface of the cap plate at the end regions is coplanar with the inner surface of the cap plate at the center region, and wherein the terminal plate and the electrode terminal are coupled to the cap plate, the terminal plate and a lower portion of the electrode terminal being disposed in a region between the grooves.

6. The prismatic battery as claimed in claim 5, wherein the grooves are continuously formed in loop shape and enclose the center region.

7. The prismatic battery as claimed in claim 6, wherein the loop-shaped grooves enclose a rectangular region.

8. The prismatic battery as claimed in claim 5, wherein at least two grooves are extended laterally across a width of the cap plate.

9. A battery housing of a prismatic battery for housing a battery electrode assembly, the battery housing comprising:
  a body, the body defining a space to contain the battery electrode assembly and the battery electrode assembly including electrode plates and a separator; and
  a cap plate defining an upper wall of the space, the cap plate being configured to deform away from the space when predetermined sides of the body are deformed toward the space, and the cap plate having at least two stepped portions extending away from the space, the at least two stepped portions:
    forming one concave feature around a center region including a center portion on which a hole is formed, and
    offsetting the center region from peripheral regions of the cap plate such that a distance from the center region to the space is greater than a distance from peripheral regions to the space,
  wherein each stepped portion has a side surface inclined at an angle with respect to a major surface of the cap plate,
  wherein the hole is defined through the concave feature of the cap plate in the center region of the cap plate,
  wherein the electrode assembly further includes an electrode terminal disposed through the hole such that an upper portion thereof is exposed at an exterior of the prismatic battery, the electrode terminal being electrically coupled to one of the electrode plates by a terminal plate and being electrically insulated from the cap plate, and
  wherein the terminal plate and the electrode terminal are coupled to the cap plate, the terminal plate and a lower portion of the electrode terminal being disposed between the concave feature and the electrode assembly.

10. The battery housing as claimed in claim 9, wherein the body and the cap plate are monolithically formed.

11. The battery housing as claimed in claim 9, wherein the at least two stepped portions extend away from the space and laterally across a width of the cap plate, the at least two stepped portions defining the peripheral regions and the center region
  such that an inner surface of the center region is not coplanar with inner surfaces of the peripheral regions.

12. A battery housing of a prismatic battery for housing a battery electrode assembly, the battery housing comprising:
  a body, the body defining a space to contain the battery electrode assembly and the battery electrode assembly including electrode plates and a separator; and
  a cap plate defining an upper wall of the space, wherein the cap plate is configured to deform away from the space when predetermined sides of the body are deformed toward the space,
  wherein an inner surface of end regions of the cap plate is coplanar with an inner surface of a center region of the cap plate,
  wherein a hole is defined through the cap plate in the center region,
  wherein the electrode assembly further includes an electrode terminal disposed through the hole such that an upper portion thereof is exposed at an exterior of the prismatic battery, the electrode terminal being electrically coupled to one of the electrode plates by a terminal plate and being electrically insulated from the cap plate,
  wherein the cap plate has grooves, each of which being formed on the inner surface of the cap plate between the end regions of the cap plate and the center region of the cap plate and facing the space such that the grooves have a concavity open towards the space, and
  wherein the terminal plate and the electrode terminal are coupled to the cap plate, the terminal plate and a lower portion of the electrode terminal being disposed on a region between the grooves.

13. The battery housing as claimed in claim 12, wherein the grooves are continuously formed in a loop shape.

14. The battery housing as claimed in claim 13, wherein the loop-shaped grooves enclose a rectangular region.

* * * * *